(12) United States Patent
Mino

(10) Patent No.: US 12,012,278 B2
(45) Date of Patent: Jun. 18, 2024

(54) LINER AND METHOD FOR UNLOADING BULK CARGO

(71) Applicant: Oswaldo Mino, Barcelona (ES)

(72) Inventor: Oswaldo Mino, Barcelona (ES)

(*) Notice: Subject to any disclaimer, the term of this patent is extended or adjusted under 35 U.S.C. 154(b) by 209 days.

(21) Appl. No.: 17/749,341

(22) Filed: May 20, 2022

(65) Prior Publication Data

US 2022/0274772 A1 Sep. 1, 2022

Related U.S. Application Data

(63) Continuation of application No. PCT/EP2020/082985, filed on Nov. 20, 2020.

(30) Foreign Application Priority Data

Nov. 21, 2019 (EP) .................................... 19383029

(51) Int. Cl.
*B65D 88/62* (2006.01)
*B65D 88/54* (2006.01)
*B65D 90/04* (2006.01)
*B65D 90/54* (2006.01)

(52) U.S. Cl.
CPC .......... *B65D 88/546* (2013.01); *B65D 90/04* (2013.01); *B65D 90/54* (2013.01); *B65D 2588/54* (2013.01); *B65D 2590/04* (2013.01); *B65D 2590/54* (2013.01)

(58) Field of Classification Search
None
See application file for complete search history.

(56) References Cited

U.S. PATENT DOCUMENTS

| 4,861,215 A * | 8/1989 | Bonerb ................... B60P 3/426 |
| | | 414/469 |
| 5,482,425 A | 1/1996 | Podd, Jr. et al. |
| 5,653,572 A * | 8/1997 | Podd, Jr. ................ B65D 88/62 |
| | | 414/813 |

(Continued)

FOREIGN PATENT DOCUMENTS

| AU | 2013270440 B2 * | 8/2016 | .......... B29C 63/024 |
| DE | 102013224034 A1 * | 5/2015 | ................ B60P 1/38 |

(Continued)

OTHER PUBLICATIONS

International Search Report, PCT/EP2020/082985, dated Jan. 18, 2021, 6 pages.

*Primary Examiner* — Joseph A Dillon, Jr.
(74) *Attorney, Agent, or Firm* — Edell, Shapiro & Finnan, LLC

(57) ABSTRACT

A liner floor for use in a container liner is provided. The liner floor includes a floor portion arranged between a distal end and a proximal portion and the floor portion is configured for being arranged on a floor of the container. The floor portion includes a plurality of stacks of folded sections. The stacks are folded such that a top fold of one stack is connected to a bottom fold of a proximal neighbouring stack. A weight of the folded sections varies along the floor portion with each of the folded sections having at least the same weight as a proximal neighbouring folded section. Also provided are methods for unloading cargo from a container including a liner, and methods and apparatuses for loading cargo into a container.

20 Claims, 6 Drawing Sheets

(56) References Cited

U.S. PATENT DOCUMENTS

| | | | | |
|---|---|---|---|---|
| 5,657,896 A | * | 8/1997 | Matias | B65D 90/048 |
| | | | | 220/495.1 |
| 9,701,465 B2 | * | 7/2017 | Llopez-Miguel | B65D 88/72 |
| 9,738,466 B2 | * | 8/2017 | Pippin | B65G 67/24 |
| 10,322,891 B2 | * | 6/2019 | Hanses | G06F 3/04815 |
| 10,370,184 B2 | * | 8/2019 | Mino | B65D 88/66 |
| 2003/0197009 A1 | * | 10/2003 | Mino | B65D 90/046 |
| | | | | 220/1.6 |
| 2007/0000759 A1 | * | 1/2007 | Knapen | B65G 35/04 |
| | | | | 198/527 |
| 2023/0019163 A1 | * | 1/2023 | DeLong | B65D 90/048 |

FOREIGN PATENT DOCUMENTS

| | | | | |
|---|---|---|---|---|
| EP | 67483 A | * | 12/1982 | B60P 1/38 |
| EP | 0067483 A1 | | 12/1982 | |
| EP | 0593678 B1 | * | 6/1997 | |
| GB | 2226300 A | | 6/1990 | |
| JP | 2011020692 A | * | 2/2011 | |
| WO | 2015074858 A1 | | 5/2015 | |
| WO | 2018022449 A1 | | 2/2018 | |

* cited by examiner

LINER AND METHOD FOR UNLOADING BULK CARGO

CROSS-REFERENCE TO RELATED APPLICATIONS

The present application relates to and claims the benefit and priority to international Application No. PCT/EP2020/082985, filed Nov. 20, 2020, which the benefit and priority to European Application No. EP19383029.6, filed Nov. 21, 2019.

FIELD

The present disclosure relates to systems and method for loading and unloading bulk cargo from containers. The present disclosure also relates to liner floors and liners for containers that are configured to be used in unloading bulk cargo from containers. The present disclosure particularly relates to systems and methods for loading and unloading bulk cargo not depending on gravity, i.e. tiltless loading and unloading and liners suitable for such purposes.

BACKGROUND

The process of unloading dry bulk cargo from containers and foldable flexible shipping container liner-bags used in containers has generally been to have equipment that will tilt the container while fully loaded with bulk cargo to an angle, such as 45 degrees, for causing the bulk cargo to flow out of the container or container liner-bags used in containers for unloading the bulk cargo. The equipment used to tilt the container and liner-bags used in containers varies in complexity and cost depending on the length of the container. The longer containers, such as 40, 45 or 53-foot length containers, are the most expensive and difficult to unload and the shorter containers, such as 20 or 30-foot length containers, are less expensive and easier to unload, but even with the tilting equipment, problems of discharging the bulk cargo can occur. Particularly, during unloading, bulk cargo may stick together forming blocks or agglomerates of material that make smooth unloading impossible. Products may stick to the top of a trailer and may suddenly fall down. Also agglomerates or cohesive masses can suddenly surge during discharge. With very cohesive products, a quantity of product may move forward within the container as a solid mass and exert great force on the retaining bulkhead.

Further, the unloading of bulk cargo by tilting the container to pour the bulk cargo out requires special handling to keep the poured bulk cargo contained and in condition to be transported, stored or separated to be used. Tilting for unloading also carries with it specific risks of tipping and falling of trucks e.g. in high winds, unlocking of twist locks, mechanical failure of support legs, damaging nearby trees, or other structures etc.

Also, not every shipping destination has tilting equipment for any and every container size or length because of the volumes of shipping required to justify the costs of tilting equipment and its frequency of use may make the tilting equipment cost prohibitive at some stepping destinations because of lower volumes. As a result, these 40, 45 or 53-foot bulk loaded shipping containers must be sent to specialized third party logistics 3PL's suppliers which have specialized equipment to remove the loaded container from its chassis and load it to a stationary tilting platform for the unloading of its contents to any other transportation or storage means for subsequent moves to the end destination.

Also the lack of availability of tilting chassis for 40, 45 or 53-foot bulk containers that can be transported long range distances on the existing railway system, has led to the proliferation of tilting bulk cistern trucks doing this service. However, this solution adds to the already congested crowded over-the-road traffic and at the same time also poses the same risk associated with tipping loaded vessels for unloading cargo. These extra handling and logistics add cost, time and bottlenecks to the supply chain of commodities being transported in bulk.

Additionally, due to the large size and lateral surface area of these larger containers, side winds make tilting chassis unsafe to operate as they may become unstable, thus requiring the use of stationary tilting platforms fixed at ground level to secure stability during the tilting phase. A stationary platform then requires the use of specialized equipment called container stackers capable of removing the loaded container from its transport chassis and loading it to the stationary platform for the unloading. These units are quite expensive and thus are only available at specialized logistic terminals.

To find other processes than tilting the container- and the container liner-bags used in the unloading process of dry bulk cargo, the shipping industry has attempted to use other technologies such as laying a floor liner in a container and then loading the bulk cargo on top. Once shipped, they then tried to unload the bulk cargo by pulling the floor liner out of the container. This approach got varying and uneven results of unloading the bulk cargo from the container liners in the container. In many cases using these processes of pulling the floor liner out of the container much of the bulk cargo was left behind and in stacks caused by bridging of the bulk cargo and piling up. The incomplete results required operators to go into the container liners with shovels to remove the remaining bulk cargo left behind. Also, in some applications of using the process of pulling out the liner the liners would get trapped between the bulk cargo and the container liner floor and cause the floor liners to snap or break causing the process to be stopped completely with only a part of the bulk cargo discharged from the container.

WO 2018/022449 discloses a tilt-less liner apparatus and system for unloading bulk cargo from a container liner using a first layer on the container liner floor having a friction reducing top layer and a friction enhancing bottom layer to secure first layer against movement. A second layer of flexible high strength material folded in over lapping multiple pre-folded sections from at least two to eight folded stacked layers are used to cover the friction reducing top first layer. The second layer is connected to a coiling means and motor for coiling up and removing the second layer from the container over the friction reducing top layer of the first layer and the bulk cargo comes out with the second layer into a hopper provided with means for bulk product distribution.

Although the systems and methods disclosed in this prior art document show significant improvements with respect to systems known before it, improvements to such tilt-less systems are still possible. One disadvantage relates to a quite laborious manufacturing process of the liner floor. Another problem has been encountered that for particularly high weight bulk cargo, unloading is only possible with extensive effort.

Different methods and systems for loading cargo into a container exist. One known method includes unloading bulk cargo from a silo and using a pneumatic system to transport and blow the bulk cargo into the container carried by a truck. These systems may be used e.g. for cargo in powder form. One disadvantage of such a system is that loading a container can take a long time. e.g. 45 minutes to 90 minutes may be needed to substantially fill a standard size 20 ft long container. Another disadvantage is the significant energy consumption needed for blowing the material pneumatically while at the same time requiring energy to run dust collector systems to remove the excess air coming out with dust emission and to separate the particles from the air to dissipate it to the environment. Another disadvantage is that pneumatics add air into the particles and thereby increase the volume of the material being loaded. This in turn leads to a lower cargo utilization.

Another method relies on tilting of the container arranged on a truck. The loading in this case may be quicker than in the previous case. However, loading through gravity is not suitable for all types of bulk cargo and moreover requires a silo to be arranged at increased heights. Moreover, a tilting chassis is required on the truck to tilt the container. This option is thus not available if a silo does not have the minimum height required or if a truck without tilting chassis is to be used.

Yet another method relies on a mechanical conveyor system. e.g. a conveyor belt is arranged to receive bulk cargo from a silo, and the cargo is then conveyed on the belt. The relative position of the belt with respect to the container may be changed in order to be able to fill the container.

In another mechanical conveyor system, a screw conveyor mechanism may be used, wherein a loading apparatus receives the bulk cargo from a silo, and the bulk cargo is then displaced into the container using one or more conveyor screws. One problem generally encountered in these methods is that it is complicated to fill the container to an adequate level. In particular, the cargo accumulates close to the entry and in the centre of the container.

The present disclosure in various examples provides methods, systems, and devices for loading and unloading bulk cargo that at least partially resolve some of the aforementioned problems.

SUMMARY

In a first aspect, a liner floor for use in a container liner is provided. The liner floor comprises a distal end for attachment to the container liner at an end wall of a container, and a proximal portion for extending through an opening in the container liner at a discharge end of the container. The liner floor further comprising a floor portion arranged between the distal end and the proximal portion and the floor portion configured for being arranged on a floor of the container. The floor portion comprises a plurality of stacks of folded sections of the floor portion, wherein the stacks are folded such that a top fold of one stack is connected to a bottom fold of a neighbouring stack that is arranged closer to the proximal portion, and a weight of the folded sections of the stacks varies along the floor portion. In particular, each of the stacks has at least the same weight as a neighbouring more proximal stack.

In accordance with this aspect, a liner floor is provided which is able to unload even relatively heavy bulk cargo in a simplified manner. The multiple stacks of folds are forced to unfold as the floor liner is removed. As the folds unfold, movement is created that creates successive voids into which the stored and compacted bulk cargo can move. Increased movements help to release the bulk cargo and break it up.

It has been found that increasing the weight of the stacks of folded sections from a proximal discharge end to a distal end is beneficial because of the increased strength required to move the bulk cargo. Essentially, as the liner floor is pulled out, the pressure that the liner floor has to sustain to provide movements to the bulk cargo, including small upwards movements of the bulk cargo increases from a proximal end to a distal end. This can be resolved by providing more material or stronger material for the liner floor.

It has further been found that arranging the folds facing in the same direction, i.e. a bottom fold of one stack is connected to a neighbouring top fold for all consecutive stacks is beneficial as well, as it allows for easier unfolding of the successive stacks.

In some examples, a surface area of the folded sections of the stacks varies along the floor portion. I.e. the (combined) surface area of a stack may generally increase from a proximal discharge portion to a distal portion. In some examples, each of the stacks may have at least the same surface area as a neighbouring more proximal stack.

In some examples, the number of folded sections of the stacks varies along the floor portion. Alternatively or additionally, a width of the folded sections of the stacks may be varied along the floor portion.

In some examples, the liner floor may be made from a polymer material, optionally from woven polymer material, and a density of the polymer material varies along the floor portion. Apart from varying the width of the folds, and the number of folds, also the material of the liner floor may be varied from a proximal end to a distal end. Particularly, the density of the polymer material at or near the end wall of the container may be higher than the density at or near the discharge end.

It should be clear that various of these options (varying width of folds, varying number of folds, and varying density of the material) may be combined as well.

In some examples, a folded section of one or more of the stacks is connected to another folded section (that lying on top of or lying below the folded section) of the stacks by ultrasound welding. Manufacturing can be simplified herewith. In one prior art solution, tape was used to make folded sections stick together. There is however a risk that such tape may be released entirely and end up mixed in the cargo.

In a further aspect, a liner comprising a liner floor in accordance with any of the examples herein disclosed is provided.

In some examples, the proximal portion of the liner floor is removably attached to an outside of the liner, and at or near the opening of the liner. The liner floor may thus be easily grabbed from the outside of the liner without the need to open the liner. The liner may thus be attached to a coiling member that can pull the liner floor. In some examples, the proximal portion has an additional portion extending from the point of attachment, thus giving an extra length for the floor liner for its introduction into a coiling member.

In some examples, the liner may further comprise a discharge sleeve. Such a discharge sleeve may be used to provide a sealed connection with a hopper. The sleeve may be attached to the hopper before opening the liner and releasing the bulk cargo.

In a further aspect, a method for unloading bulk cargo from a container is provided, the bulk cargo being arranged in the liner according to any of the examples herein described. The method comprises attaching the proximal portion of the floor liner to a coiling member, and pulling the liner floor by rotating the coiling member. The floor liner may be wound up on the coiling member and thereby pulled from the liner. The bulk cargo arranged on top of it is moved and shaken by the folded sections unfolding. The moving and shaking can prevent agglomerations of bulk material to form or can help break them down and facilitate unloading.

In some examples, the method may further comprise fluidizing underneath the floor liner during the pulling of the floor liner. This may reduce friction and allow for easier coiling of the liner floor.

In yet a further aspect, a loading apparatus for loading bulk cargo into a container is provided. The loading apparatus comprises a receiver for receiving the bulk cargo from a storage, a conveyor for conveying the received bulk cargo from the receiver into the container. The conveyor comprises a base and an end bar, a first longitudinal beam arranged between the base and the end bar, and a second longitudinal beam arranged between the base and the end bar. And the conveyor further comprises a middle conveyor screw arranged between the first and second longitudinal beams at an inner side of the first and second longitudinal beams, a first outside conveyor screw arranged at an outer side of the first longitudinal beam, and a second outside conveyor screw arranged at an outer side of the second longitudinal beam.

In accordance with this aspect, a loading apparatus is provided that is able to load bulk cargo into a container both quickly and effectively. The loading grade that can be achieved with the loading apparatus is improved with respect to prior art apparatuses which are unable to distribute the bulk cargo over substantially the entire width and length of the container.

BRIEF DESCRIPTION OF THE DRAWINGS

Non-limiting examples of the present disclosure will be described in the following, with reference to the appended drawings, in which.

DETAILED DESCRIPTION

Figure 1:
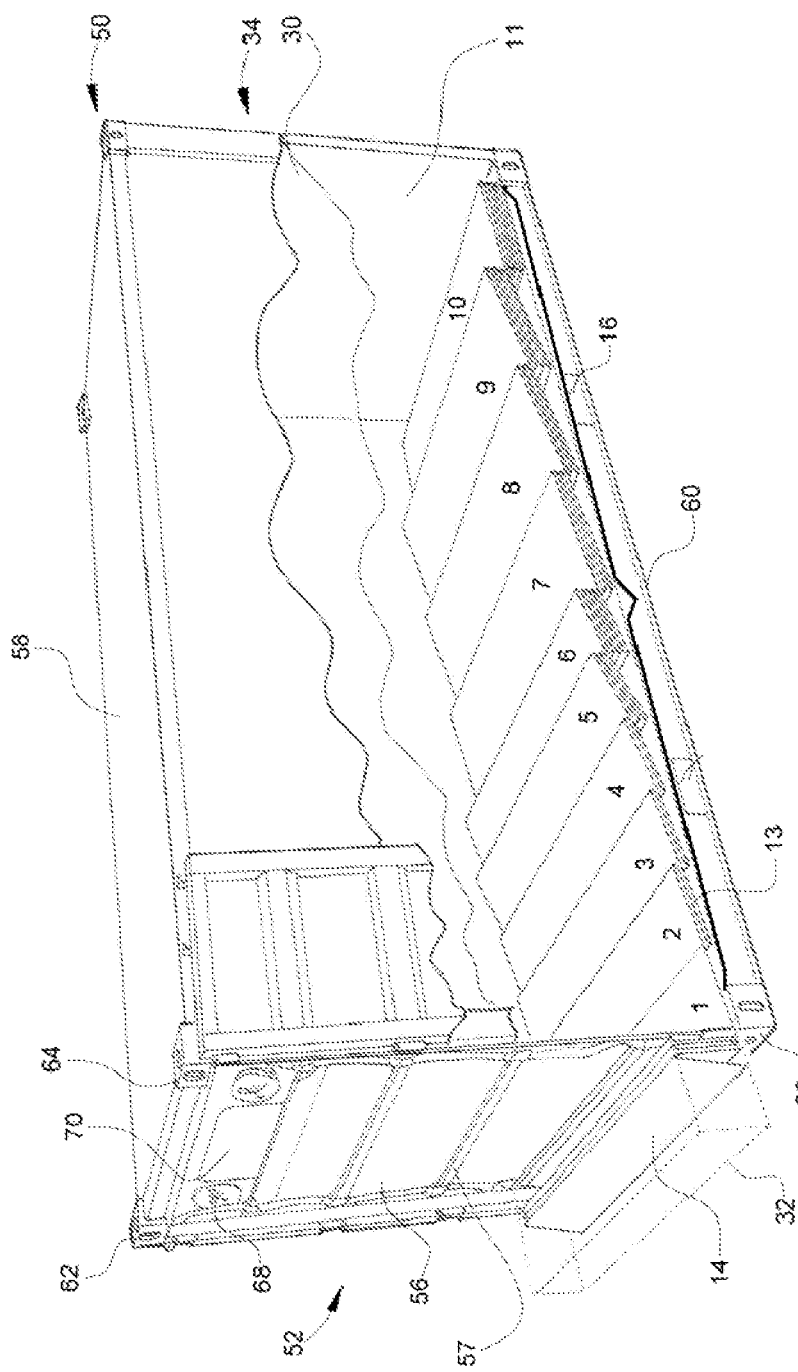
FIG. 1 schematically shows an example of a liner and liner floor in a container.

FIG. 1 schematically shows an example of a liner 30 and liner floor 13 in a container 50. The container 50 may be mounted on a truck 100 (shown e.g. in FIG. 2) and may be filled with bulk cargo. The bulk cargo may have a variety of different compositions and forms. The bulk cargo may be e.g. powder, or granular or pellets. Dry bulk cargo products may include e.g. chemicals, minerals, grains, agricultural products, feed for livestock and many other.

The container has a distal end 54 and a proximal end 52. Distal and proximal are herein defined as further away and closer to the (un)loading side of the container. Loading and unloading of the container occurs at the proximal end 52. The container further has a top side 58 and a bottom 60. The container further has two sidewalls. In the view of FIG. 1, the doors at the proximal end are not shown.

At the corners of the container 50, corner castings 62, 64, 66 (and others) are provided. These corner castings may be coupled with twistlocks and can serve as anchoring points for loading and unloading apparatus as will be explained later on.

An example of a liner floor 13 for use in a container liner 30 is shown. The liner floor 13 comprises a distal end 11 for attachment to the container liner 30 at an end wall of the container 50. The liner floor 13 further comprises a proximal portion 14 for extending through an opening in the container liner 30 at a discharge end 52 of the container 50.

The liner floor 30 further comprising a floor portion 16 arranged between the distal end 11 and the proximal portion 14. And the floor portion 16 is configured for being arranged on a floor of the container. The floor portion 16 comprises a plurality of stacks 2-10 of folded sections of the floor portion 16.

The stacks are folded such that a top fold of one stack is connected to a bottom fold of a neighbouring stack that is arranged closer to the proximal portion. This may be seen e.g. in FIGS. 1 and 3. Another way to look at this is that a bottom fold of one stack is connected to a top fold of a subsequent (more distal) stack.

As mentioned before, a weight of the folded sections of the stacks varies along the floor portion, and each of the stacks has at least the same weight as a neighbouring more proximal stack. It may be seen in FIG. 1, how for successive stacks the width of the folded sections increases and/or the number of folded section in the stacks increases from a proximal end, starting with stack 1 (which in this example does not have folded sections), then stack 2 (with three folds), stack 5 (five folds), stack 7 (five wider folds) and so on.

The liner and the liner floor may be made from a polymeric material. The liner and liner floor may be made from different materials or from the same material. The liner and liner floor may be made from woven or extruded Polyethylene (PE), Polypropylene (PP), Polyethylene Terephtalate (PET), Polyurethane (PUR), or Nylon. A density of the liner floor may be e.g. between 150-300 gr/m². In a particular example, a density of a woven PP liner floor may be between 180-240 gr/m².

Instead of the variation of surface area of the folded sections, or in addition thereto, the density of the liner floor may be varied. Portions of the liner floor closer to the back of the container may be made with an increased density as compared to portions of the liner floor closer to the front of the container.

A bulkhead 56 is formed at the front of the container with a plurality of transverse steel bars 57. As may be seen, the liner may comprise a sleeve 32, which may be a tubular sleeve through which the bulk cargo may be unloaded and which will be explained in more detail with reference to FIG. 2.

Figure 2:
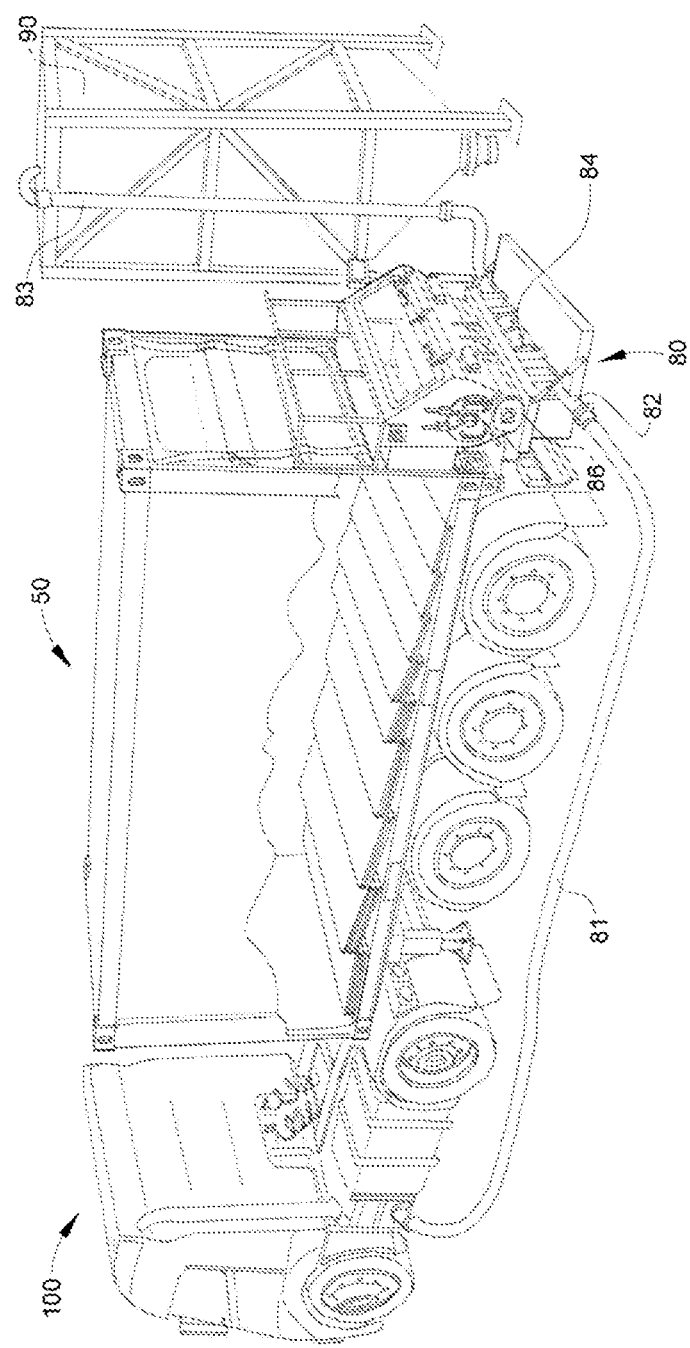
FIG. 2 schematically shows an example of a discharge apparatus connected to a container mounted on a truck to illustrate an example of unloading bulk cargo from a container.

FIG. 2 schematically shows an example of a discharge apparatus 80 connected to a container 50 mounted on a truck 100 to illustrate an example of unloading bulk cargo from the container 50.

The discharge apparatus 80 may be carried by a forklift and may be anchored to a proximal end of the container, i.e. the end at which unloading will take place, at the rear end of the truck 100. The discharge apparatus 80 may be anchored using twistlocks at the corner castings e.g. at the bottom of the container. Alternatively, the discharge apparatus can be mounted on wheels and lifted by means of pneumatics or hydraulics to align itself with the container floor in an independent manner in order to avoid the use of a forklift.

In order to discharge the cargo, the discharge sleeve 32 (as shown in FIG. 1) may be connected to a receiving mouth of the discharge apparatus 80. The connection of the discharge sleeve with the mouth of the discharge apparatus may be sealed to make sure no contamination of the cargo to be unloaded can take place. The connection may be pressurized, e.g. pneumatic to make sure the connection is sufficiently sealed.

That is, in one example, a frame of the mouth of the discharge apparatus may be removably attached to the apparatus. After removing, or slightly separating such a frame, the discharge sleeve may be introduced into the discharge apparatus. The frame may then be mounted again to clamp down on the discharge sleeve. An additional pressurization system might then be used to avoid any leaks or contamination.

A method for unloading bulk cargo from a container may comprise attaching the proximal portion 14 of the liner floor to a coiling member, and pulling the floor liner 13 by rotating the coiling member. The coiling member may be a spindle which can be driven by a motor. As the floor liner is wound on the coiling member, the liner floor is pulled out of the liner and of the container. As the liner floor is pulled, the folded sections of the various stacks arranged along the bottom of the container will unfold, stir or shake the bulk cargo and transport the cargo towards the discharge sleeve.

In some examples, the speed of discharging may be varied during the process. I.e. the speed of revolution of the coiling member may be varied. Such a variation of speed may be based on the traction force experienced during coiling. Such a force may be measured by the electromotive force necessary for retraction. If the currents measured in the motor decrease, this indicates that the force has decreased, i.e. that there is less resistance. This could indicate e.g. one of the folded sections unfolding. During such time of reduced currents, the speed of rotation might be increased until a time when the currents increase again (indicating more resistance and higher force) and the speed is reduced. In this manner the overall discharge time may be reduced and may be optimized in accordance with circumstances.

In some examples, the method further comprising fluidizing underneath the floor liner during the pulling of the floor liner. Air may be blown underneath the floor liner in order to reduce friction of the liner floor.

As the bulk cargo is delivered to the discharge apparatus, the cargo may fall in a collection chamber 84 of the discharge apparatus. One or more conveyor screws may be arranged between the collection chamber 84 and the discharge sleeve 32 to transport cargo towards the center to fall into the collection chamber. Other suitable mechanisms for transporting or conveying cargo may be arranged between the discharge sleeve and the collection chamber, such as e.g. a rotary valve, a screw feeding system, a conveyor belt or other means.

The coiling member may form part of the discharge apparatus. The collection chamber 84 may have a cargo exit and a fluid inlet 82. Pressurized air may be delivered through line 81 and the cargo may be conveyed through pipe 83 towards a storage. In the example of FIG. 2, the storage is a storage silo 90.

The discharge apparatus may further comprise a platform and/or a step for operators to stand on to assist and monitor in the unloading procedure. The discharge apparatus may further include a screen with a user interface. The screen might display the extent to which the discharge has been completed. In one example, the coiling member might register the number of revolutions it has performed for discharging, e.g. based on an encoder. Based on the number of revolutions, the length of the liner floor that has been retracted might be calculated. The length that has been retracted may thus be used to calculation the extent to which the discharge has been performed, e.g. the retracted length as a percentage of the total length of the liner floor.

Figure 3:
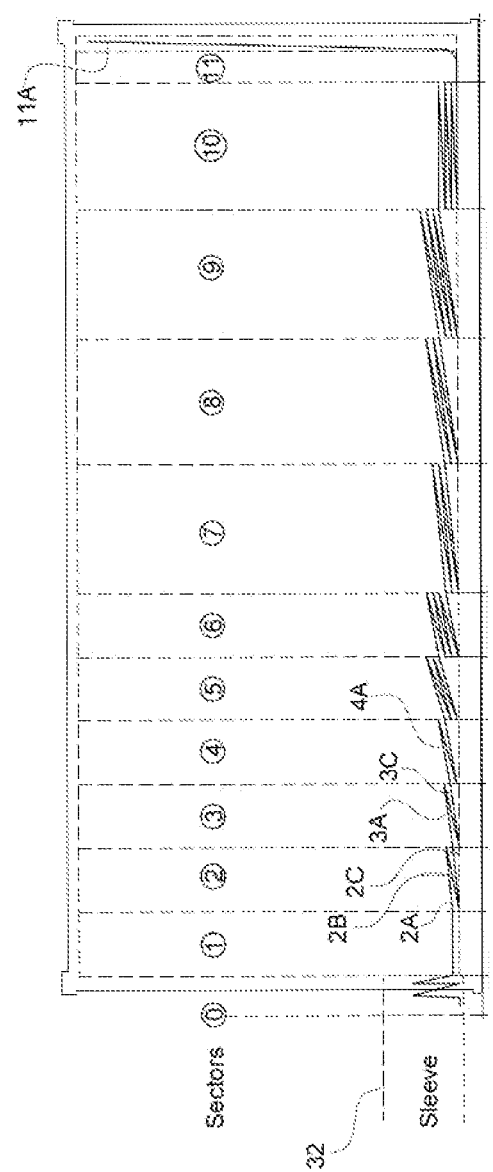
FIG. 3 schematically illustrates a cross-sectional view of a liner and liner floor arranged in a container to illustrate further details of the example shown in FIG. 1.

FIG. 3 schematically illustrates a cross-sectional view of a liner and liner floor arranged in a container to illustrate further details of the example shown in FIG. 1. A distal portion 11 of the floor liner is attached to the liner at the distal container wall. In some examples, the distal potion 11 may be attached near a top of the container at attachment point 11A.

FIG. 3 illustrates how the surface area of consecutive stacks may be varied in an example. The first stack 1 does not have any folds. The second, third and fourth stacks 2, 3, and 4 comprise three folded sections on top of each other. Second stack 2 comprises a top fold 2A, a mid-fold 2B and a bottom 2C. Stacks 3 and 4 have the same build-up.

It may be seen that all stacks are folded in the same direction. Bottom fold 2C of second stack 2 is connected to top fold 3A of stack 3. Similar connections are provided for subsequent stacks.

The width of the folded sections of stacks 2, 3 and 4 may be substantially the same. In the illustrated example for a 20 ft container, the width of the fold may be e.g. around 40 cm. In different examples, the width of the folds may be varied e.g. as a function of the weight or density of the bulk cargo, and the length of the container.

Stacks 5 and 6 in this example maintain the same width, but the number of folded sections increases Stack 5 has five folded sections and stack 6 has seven folded sections.

Stacks 7 and 8 are the same in this example and comprise five folded sections, but have an increased width as compared to stacks 1-4. For example, the width of the folded sections may be double the width of the more proximal stacks, e.g. around 80 cm.

It may be seen in FIG. 3 that for stacks 9 and 10, the width is maintained the same, but the number of folded sections is increased.

It should be clear that within the scope of the present disclosure, the number of stacks, the width of the stacks and the number of folds for the stacks may be varied. In further examples, also the density of the floor liner may be varied.

In the example of FIG. 3, widths of around 40 cm and multiples thereof have been chosen to arrive at a length of around 5.6 meters. The internal length of a standard 20 foot container is about 5.89 meters.

Figure 4:
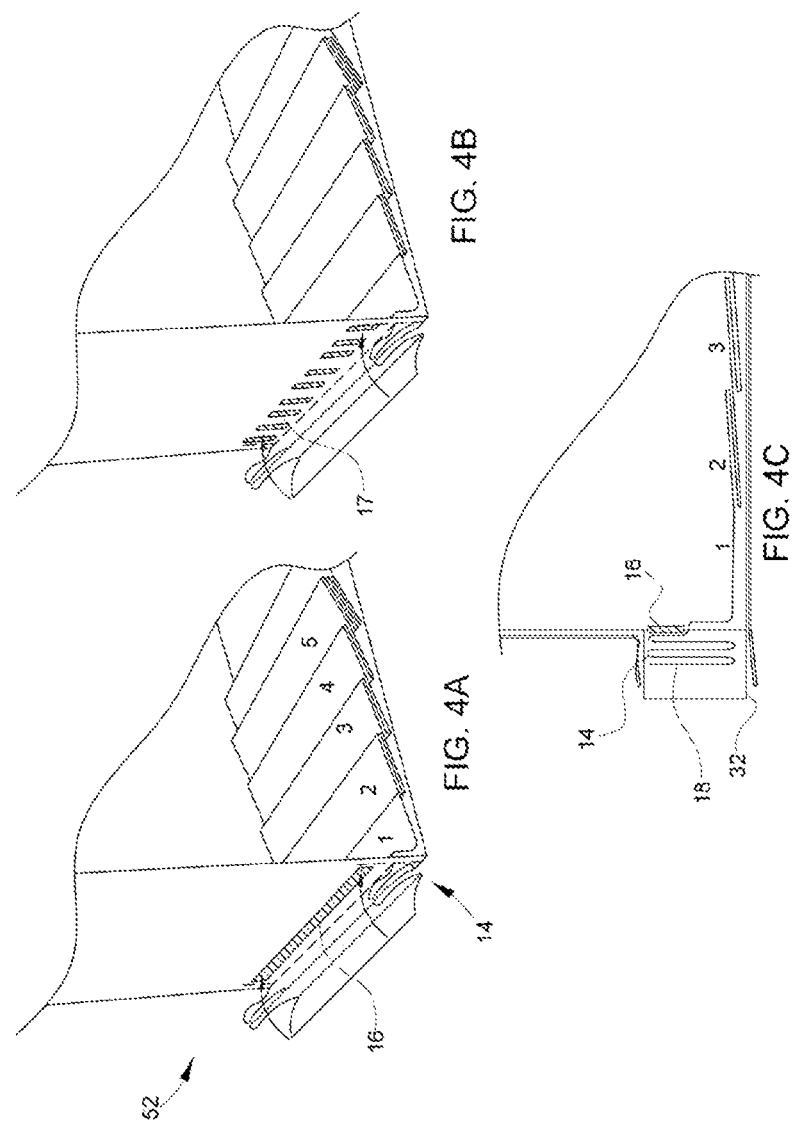
FIGS. 4A-4C schematically illustrate different examples of liner floors and liners.

FIGS. 4A-4C schematically illustrate different examples of liner floors and liners. In order to be able to attach the liner floor to without opening the liner (and thereby releasing part of the cargo), a proximal portion 14 extends through an opening of the liner. The opening of the liner is sealed to the extent possible. In order to avoid any cargo from being released, the proximal portion 14 may be attached to an outside of the liner at attachment 16. The attachment may be removable. In one example, adhesive(s) may be used.

In the example of FIG. 4A, an adhesive strip 16 is attached to the outside of the liner. The proximal portion may be attached at strip 16. In order to unload cargo, proximal portion 14 may first be attached to a coiling member or any other system for pulling the liner floor. In order to have sufficient length for attachment to such a coiling member, the proximal portion 14 may include an additional portion 18, which may include several folds. The provision of several folds increases the length of the additional portion that can be provided within discharge sleeve 32. After connection has been made with the coiling member, coiling may start slowly to tension proximal portion and subsequently release the attachment at strip 16.

Then, the liner may be opened. The coiling member may be stopped temporarily when the liner is being opened. Depending e.g. on the coiling speed, the coiling member may continue running without the need for interruption. Then the coiling member may be started again to pull the liner floor and unfolding the subsequent stacks 1, 2, 3, 4, 5, etc.

FIG. 4C illustrates details of the example of FIG. 4A. In particular, it is illustrated that the proximal portion may be arranged within discharge sleeve 32 of the liner. The proximal portion may be attached at adhesive strip 16. An additional portion 18 including multiple folds is provided to provide for sufficient length to attach the liner floor with a coiling member (or any other mechanism for pulling the liner floor). The additional portion 18 of the liner floor may herein be regarded as the portion of the liner floor that is most proximal and that which extends beyond the attachment point of the outside of the liner.

In the example of FIG. 4B, a plurality of vertical adhesive strips 17 are provided substantially extending along the width of the liner. The method for pulling the liner floor and for unloading the cargo may be the same as before. In some examples, both in the configuration of FIG. 4A and in the configuration of FIG. 4B, the adhesive strips may be double-sided tape.

Figure 5:
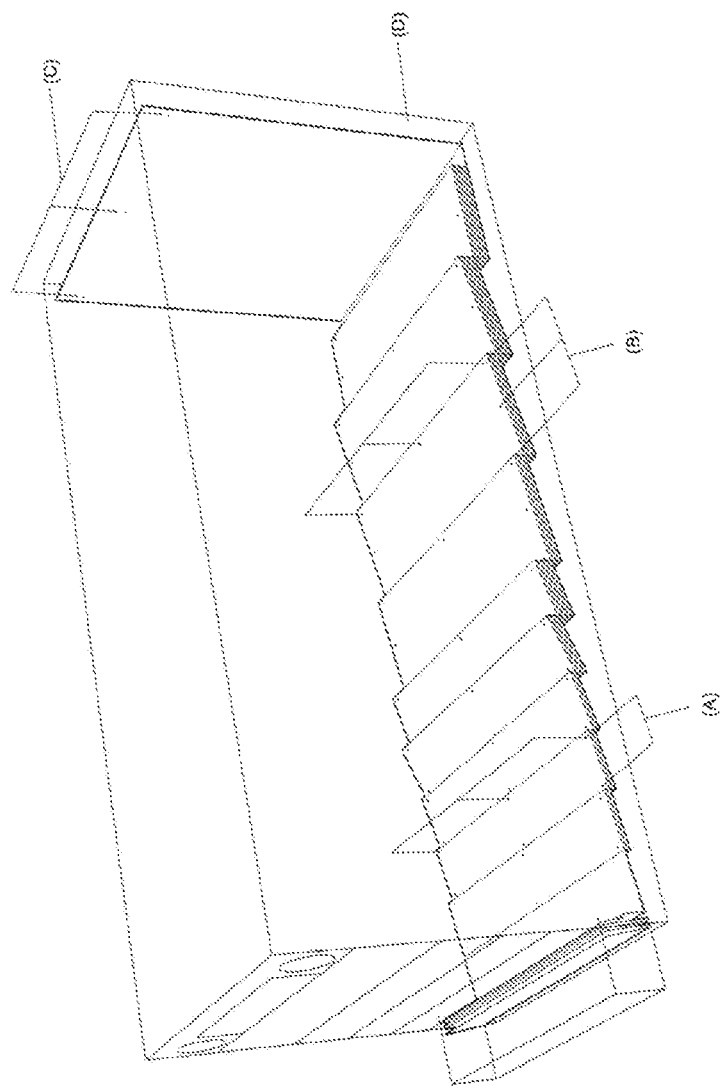
FIG. 5 schematically illustrates an example of how folded sections in an example of a floor liner may be manufactured.

FIG. 5 schematically illustrates an example of how folded sections in an example of a floor liner may be manufactured. Folded sections of one or more of the stacks is connected to another folded section of the stacks by ultrasonic welding. In the example of FIG. 5, the more proximal stacks have a reduced width as compared to the more distal stacks. In particular, the width of the more proximal stacks may be e.g. around 40 cm. The wider stacks have a width of around 80 cm.

For the narrower stacks, ultrasonic welding points may be provided close to proximal edge and close to a rear edge of the folded sections. Detachment of the folded sections will thus occur at those welding points close to the edges. In this example, three welding points are shown along the width of the container. It should be clear that different numbers of welding points may be chosen.

As the liner floor is pulled out, detachment of a fold will occur first at a proximal side of a fold. As the detachment occurs, the bulk cargo on top of the fold is moved upwards a little bit, and moved around.

For the wider stacks, welding points are distributed similarly along the width of the container, but there are three rows of welding points (rather than two rows for the more proximal stacks) over the width of the folded sections (i.e. in the longitudinal direction of the container). The three rows include a proximal row at or near a proximal edge of the folds, an intermediate row substantially in the middle of the folds, and a distal row at or near a distal edge of the fold.

Figure 6:
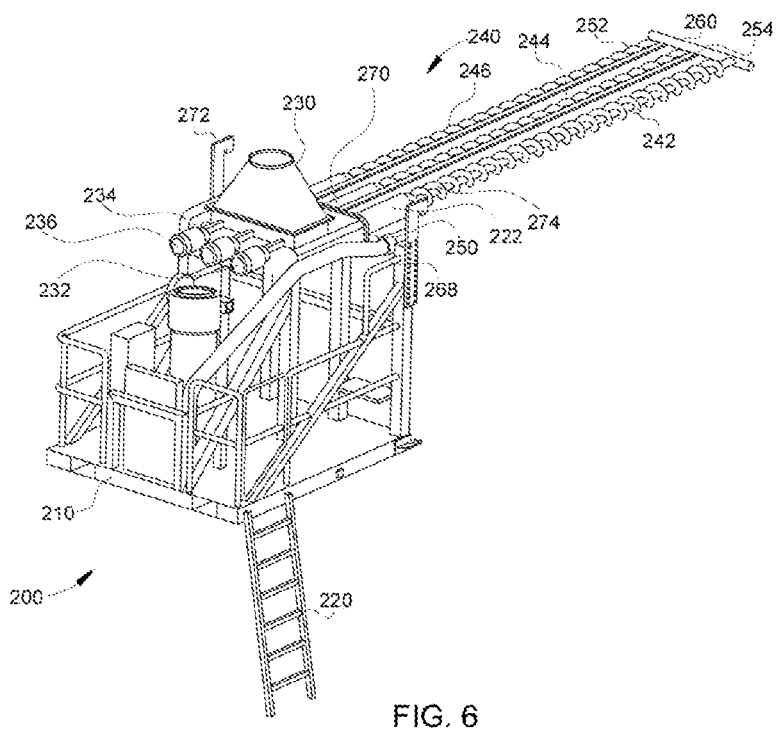
FIG. 6 schematically represents an example of a loading apparatus for loading bulk cargo into a container.

FIG. 6 schematically represents an example of a loading apparatus for loading bulk cargo into a container. A loading apparatus 200 for loading bulk cargo into a container is shown. The loading apparatus 200 comprising a receiver 230 for receiving the bulk cargo from a storage. The storage may be e.g. a storage silo.

The loading apparatus 200 comprises a conveyor 240 for conveying the received bulk cargo from the receiver 230 into the container. The conveyor 240 comprises a base 250 and an end bar 260, a first longitudinal beam 252 arranged between the base 250 and the end bar 260, and a second longitudinal beam 254 arranged between the base 250 and the end bar 260.

The conveyor further comprises a middle conveyor screw 244 arranged between the first 252 and second longitudinal beams 254, at an inner side of the first and second longitudinal beams 252, 254. The conveyor further comprises a first outside conveyor screw 246 arranged at an outer side of the first longitudinal beam 252, and a second outside conveyor screw 242 arranged at an outer side of the second longitudinal beam 254.

With a conveyor of these characteristics, bulk cargo can be relatively quickly loaded into a container. Moreover, an effective filling of the container can be achieved, because the outside conveyor screws force the cargo the sides and corners of the containers. In prior art systems, a frame of beams or bars is often arranged around the conveyor screws and this limits the spreading of the cargo to the sides of the container. In other prior art systems, casings are provided along substantially the entire length of the conveyor screws. These casings may be provided to ensure that the cargo is transported to the distal end of the container, but they have a downside in that they prevent the cargo from being distributed effectively towards the sidewalls of the container.

As shown in the example of FIG. 6, the first outside conveyor screw 246 and the second outside conveyor screw 242 may be configured to have opposing threads. The loading apparatus 200 may further comprise a motor drive for each of the conveyor screws. Three individual drives for the three conveyor screws including motors 232, 234 and 236 are provided.

Each of the conveyor screws 242, 244, 246 in this example comprises a casing 222 generally extending from the base 250. The casing 222 is only partial in that it does not extend along the full length of the conveyor screws as in some prior art arrangements. The partial casing means that the cargo is released earlier and spreading throughout the container is enabled without the need for a relative movement between the loading apparatus 200 and the container chassis.

In some examples, the partial casings may cover less than 50% and particularly less than 25% of a length of the conveyor screws. In some examples, the casings of the conveyor screws have a length such the casings 222 extend at least 1 meter into the container when the loading apparatus 200 is attached to the container.

In order to attach the loading apparatus 200 to a container, it may be lifted with a forklift. The platform 210 may include suitable recesses or sleeves 212, 214 for receiving the fork of a forklift (see FIG. 7). The loading apparatus may be attached using twist-locks 272, 274 at corner castings of the container. Alternatively, the loading apparatus can be mounted on wheels and provided with motorized front driving wheels and pneumatic or hydraulics to allow upward/downward movement to allow for differences in container chassis heights as well as container heights. With such systems, aligning or levelling of the loading apparatus 200 and a container can also be ensured.

The loading apparatus 200 may further comprise one or more air blowers to inflate and keep the liner fully inflated against the inner container walls. The loading apparatus 200 may further comprise a dust collector device to separate dust coming out of the liner while loading and also acting as a pressure relief to avoid the liner-bag from being over-pressurized and thereby risking rupture of the liner. In the loading apparatus, pressure sensors may be incorporated that are configured to measure the presser inside the liner. On the basis of these measurements, the air blowers may be controlled to maintain the pressure level below a maximum threshold (to avoid rupture) or in a predefined pressure range (to optimize loading while avoiding the risk of rupture).

The loading apparatus may further comprise a ladder 220 for operators to reach platform 210. From the platform, manual operations such as e.g. attaching fluid lines 268, starting and stopping conveyor screws, attaching a vent sleeve and dust collection sleeve to fluid lines 268 from a storage silo to receiver 230.

Figure 7:
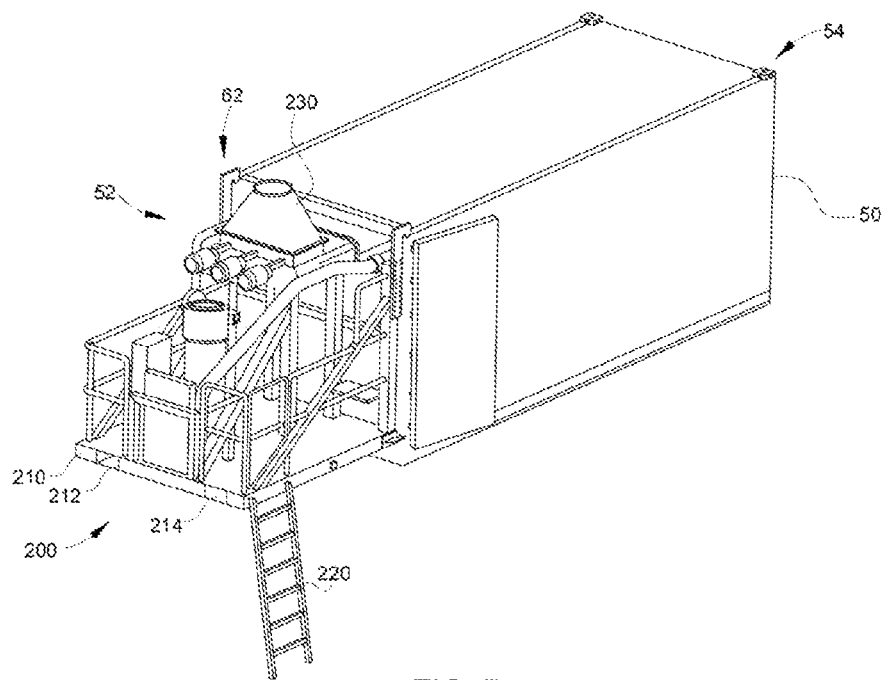
FIG. 7 schematically illustrates the same example of a loading apparatus attached to a container loaded on a truck.

FIG. 7 schematically illustrates the same example of a loading apparatus attached to a container 50 which may be loaded on a truck. The loading apparatus is attached at rear end 52 of the container.

For reasons of completeness, several aspects of the present disclosure are set out in the following numbered clauses:

Clause 1. A liner floor for use in a container liner, wherein the liner floor comprises a distal end for attachment to the container liner at an end wall of a container, and a proximal portion for extending through an opening in the container liner at a discharge end of the container,
  the liner floor further comprising a floor portion arranged between the distal end and the proximal portion and the floor portion configured for being arranged on a floor of the container, wherein
  the floor portion comprises a plurality of stacks of folded sections of the floor portion, wherein
  the stacks are folded such that a top fold of one stack is connected to a bottom fold of a neighbouring stack that is arranged closer to the proximal portion,
  a weight of the folded sections of the stacks varies along the floor portion, and wherein
  each of the stacks has at least the same weight as a neighbouring more proximal stack.

Clause 2. The liner floor according to clause 1, wherein a surface area of the folded sections of the stacks varies along the floor portion.

Clause 3. The liner floor according to clause 2, wherein each of the stacks has at least the same surface area as a neighbouring more proximal stack.

Clause 4. The liner floor according to clause 2 or 3, wherein a number of folded sections of the stacks varies along the floor portion.

Clause 5. The liner floor according to any of clauses 2-4, wherein a width of the folded sections of the stacks varies along the floor portion.

Clause 6. The liner floor according to any of clauses 1-5, wherein the liner floor is made from a polymer material, optionally from a woven polymer material, and wherein a density of the polymer material varies along the floor portion.

Clause 7. The liner floor according to clause 6, wherein the density of the polymer material at or near the end wall of the container is higher than the density at or near the discharge end.

Clause 8. The liner floor according to any of clauses 1-7, wherein a folded section of one or more of the stacks is connected to another folded section of the stacks by ultrasound welding.

Clause 9. A liner comprising the liner floor according to any of clauses 1-8.

Clause 10. The liner of clause 9, wherein the proximal portion of the liner floor is removably attached to an outside of the liner, and at or near the opening of the liner.

Clause 11. The liner of clause 10, wherein the proximal portion of the liner floor portion is adhesively attached to the outside of the liner.

Clause 12. The liner of clause 10 or 11, wherein the proximal portion has an additional portion extending from the attachment to the outside of the liner, and optionally wherein the additional portion comprises a plurality of folds.

Clause 13. The liner of any of clauses 9-12, further comprising a discharge sleeve.

Clause 14. A method for unloading bulk cargo from a container, the bulk cargo being arranged in the liner of any of clauses 9-13, the method comprising:
  attaching the proximal portion of the liner floor to a coiling member, and
  pulling the floor liner by rotating the coiling member.

Clause 15. The method of clause 14, the method further comprising fluidizing underneath the floor liner during the pulling of the floor liner.

Clause 16. The method of clause 14 or 15, wherein the coiling member forms part of a discharge apparatus.

Clause 17. The method of clause 16, wherein the discharge apparatus is attached to the container, optionally through twist-locks.

Clause 18. The method according to clause 16 or 17, wherein the liner comprises a discharge sleeve, and the method comprising
  attaching the discharge sleeve to a mouth of the discharge apparatus.

Clause 19. The method according to any of clauses 16-18, wherein the discharge apparatus comprises a collection chamber for receiving the bulk cargo.

Clause 20. The method according to clause 19, wherein the collection chamber has a cargo exit, and a fluid inlet, and wherein pressurized fluid conveys the bulk cargo from the collection chamber to a storage.

Clause 21. The method according to clause 20, wherein the storage is a storage silo.

Clause 22. The method according to any of clauses 14-21, wherein the rotating of the coiling member comprises rotating at a variable speed.

Clause 23. The method according to clause 22, wherein the speed is varied as a function of a traction force required for pulling the liner floor, and optionally wherein the traction force is determined by measuring currents in a motor driving the coiling member.

Clause 24. A loading apparatus for loading bulk cargo into a container, the loading apparatus comprising
  a receiver for receiving the bulk cargo from a storage,
  a conveyor for conveying the received bulk cargo from the receiver into the container, wherein
  the conveyor comprises a base and an end bar, a first longitudinal beam arranged between the base and the end bar, a second longitudinal beam arranged between the base and the end bar, and the conveyor further comprising
  a middle conveyor screw arranged between the first and second longitudinal beams, at an inner side of the first and second longitudinal beams,
  a first outside conveyor screw arranged at an outer side of the first longitudinal beam, and
  a second outside conveyor screw arranged at an outer side of the second longitudinal beam.

Clause 25. The loading apparatus according to clause 24, wherein the first outside conveyor screw and the second outside conveyor screw are configured have opposing threads.

Clause 26. The loading apparatus according to clause 24 or 25, further comprising a motor drive for each of the conveyor screws.

Clause 27. The loading apparatus according to any of clauses 24-26, wherein each of the conveyor screws comprises a casing generally extending from the base.

Clause 28. The loading apparatus according to clause 27, wherein the casings cover less than 50% and particularly less than 25% of a length of the conveyor screws.

Clause 29. The loading apparatus according to clause 28, wherein the casings of the conveyor screws have a length such the casings extend at least 1 meter into the container when the loading apparatus is attached to the container.

Clause 30. The loading apparatus according to any of clauses 24-29, further comprising twist-locks for attaching to corner castings of the container.

Clause 31. The loading apparatus according to any of clauses 24-29, further comprising a carriage with wheels, and a system for adjusting a height of the conveyor and the receiver with respect the carriage.

Clause 32. The loading apparatus according to any of clauses 24-31, further comprising one or more fluid lines to introduce pressurized air into the container.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

What is claimed is:

1. A liner for use in a container having an end wall, a discharge end and a floor extending from the end wall to the discharge end,
    the liner extending from the end wall of the container to the discharge end of the container, and the liner having an opening at the discharge end of the container, and further comprising a liner floor and a discharge sleeve at the discharge end of the container and, wherein
    the liner floor comprises a distal end for attachment to an inside of the liner at the end wall of the container, and a proximal portion for extending through the opening of the liner at the discharge end of the container,
    the liner floor further comprising a floor portion arranged between the distal end and the proximal portion and the floor portion configured for being arranged on the floor of the container, wherein
    the floor portion comprises a plurality of stacks of folded sections of the floor portion, wherein each of the stacks is folded such that a top fold of one stack is connected to a bottom fold of a proximal neighbouring stack,
    a weight of the folded sections of the stacks varies along the floor portion, and wherein
    the weight of each of the stacks is the same as or more than the weight of a neighbouring proximal stack, and wherein the proximal portion of the liner floor is removably attached within the discharge sleeve to an outside of the liner, at or near the opening of the liner.

2. The liner according to claim 1, wherein a surface area of the folded sections of the stacks varies along the floor portion.

3. The liner according to claim 2, wherein each of the stacks has a same or greater surface area than a proximal neighbouring stack.

4. The liner according to claim 2, wherein a number of folded sections of the stacks varies along the floor portion.

5. The liner according to claim 2, wherein a width of the folded sections varies along the floor portion.

6. The liner according to claim 1, wherein the liner floor is made from a polymer material.

7. The liner according to claim 6, wherein a density of the polymer material at or near the distal end of the liner floor is greater than a density of the polymer material at or near a proximal end of the liner floor.

8. The liner according to claim 6, wherein the polymer material is a woven polymer material.

9. The liner according to claim 1, wherein at least some of the folded sections are connected by ultrasound welding.

10. The liner according to claim 1, wherein the proximal portion of the liner floor is adhesively attached to the outside of the container liner.

11. The liner of claim 10, wherein the liner floor further comprises an additional portion extending from an attachment of the proximal portion of the liner floor to the outside of the liner, and wherein the additional portion comprises a plurality of folds.

12. The liner of claim 1, wherein the proximal portion of the liner floor is configured to be attached to a coiling member.

13. A liner for use in a container, and comprising a liner floor, wherein
    the liner floor comprises a distal end for attachment to the liner at an end wall of the container, and a proximal portion for extending through an opening in the liner at a discharge end of the container,
    the liner floor further comprising a floor portion arranged between the distal end and the proximal portion and the floor portion configured for being arranged on a floor of the container, wherein
    the floor portion comprises a plurality of stacks of folded sections of the floor portion, wherein
    each of the stacks is folded such that a top fold of one stack is connected to a bottom fold of a neighbouring stack that is arranged closer to the proximal portion, and wherein
    a weight of the folded sections of the stacks varies along the floor portion, and the weight of each of the stacks is the same as or more than the weight of a neighbouring stack that is arranged closer to the proximal portion, and
    a width of the folded sections of the stacks varies along the floor portion, and the width of each of the stacks is the same as or more than the width of the neighbouring stack that is arranged closer to the proximal portion.

14. The liner according to claim 13, wherein a number of folded sections of the stacks varies along the floor portion.

15. The liner according to claim 13, wherein the liner further comprises a discharge sleeve, and wherein the proximal portion of the liner floor is removably attached to an outside of the liner, at or near the opening of the liner within the discharge sleeve.

16. The liner according to claim 13, wherein the liner floor is made of a woven polymer material.

17. The liner according to claim 16, wherein a density of the polymer material at or near the distal end is greater than a density of the polymer material of the proximal portion.

18. The liner according to claim 15, wherein the proximal portion of the liner floor is configured to be attached to a coiling member.

19. A container comprising the liner of claim 1, and wherein the liner is filled with dry bulk cargo arranged on top of the liner floor.

20. A container comprising the liner of claim 18, and wherein the liner is filled with dry bulk cargo arranged on top of the liner floor.

\* \* \* \* \*